(12) United States Patent
Lin

(10) Patent No.: US 6,240,367 B1
(45) Date of Patent: May 29, 2001

(54) FULL FUSION POSITIONING METHOD FOR VEHICLE

(76) Inventor: Ching-Fang Lin, 9131 Mason Ave., Chatsworth, CA (US) 91311

( * ) Notice: Subject to any disclaimer, the term of this patent is extended or adjusted under 35 U.S.C. 154(b) by 0 days.

(21) Appl. No.: 09/256,509

(22) Filed: Feb. 22, 1999

Related U.S. Application Data

(60) Provisional application No. 60/110,096, filed on Nov. 27, 1998.

(51) Int. Cl.[7] ........................................... G01S 5/02
(52) U.S. Cl. ........................... 701/214; 701/220; 701/216; 342/357.14
(58) Field of Search ..................................... 701/207, 213, 701/214, 215, 216, 217, 220; 342/357.01, 357.06, 357.12, 357.14

(56) References Cited

U.S. PATENT DOCUMENTS

| | | | |
|---|---|---|---|
| 5,390,125 | * 2/1995 | Sennott et al. | 701/214 |
| 5,416,712 | * 5/1995 | Geier et al. | 342/357.14 |
| 5,563,611 | * 10/1996 | McGann et al. | 342/357.14 |
| 5,745,868 | * 4/1998 | Geier | 701/216 |
| 5,877,723 | * 3/1999 | Fan | 701/216 |
| 5,906,655 | * 5/1999 | Fan | 701/216 |
| 6,092,033 | * 7/2000 | Uhlmann | 701/214 |

* cited by examiner

Primary Examiner—Gary Chin
(74) Attorney, Agent, or Firm—Raymond Y. Chan; David and Raymond Patent Group

(57) ABSTRACT

A full fusion positioning method, which can be implemented in the existing hardware, but is more amenable to the emerging wafer-scale integration hardware, comprises the steps of injecting a global positioning system signal received by a global positioning system antenna and a predicted pseudorange and delta range from a data fusion, and converting and tracking said global positioning system signal to obtain pseudorange and delta range measurement and errors of said pseudorange and delta range measurement, which are passed to said data fusion; receiving a vehicle angular rate and an acceleration signal/data from an inertial measurement unit and solving inertial navigation equations for obtaining a referencing navigation solution, including position, velocity, and attitude, which are passed to a data fusion; and fusing said pseudorange and delta range measurement and said errors of said pseudorange and delta range measurement of said global positioning system and said referencing navigation solution to obtain predicted pseudorange and delta range, optimal estimates of said referencing navigation solution errors and inertial sensor errors, and optimal position information.

32 Claims, 6 Drawing Sheets

FULL FUSION POSITIONING METHOD FOR VEHICLE

This is a regular application of a provisional application having an application number of 60/110,096, filed on Nov. 27, 1998. The present invention relates to a positioning method, and more particularly to a full fusion positioning method for vehicle, wherein signals from global positioning system, inertial angular sensors, and inertial acceleration sensors are processed in full fusion to obtain improved performance in some stress applications such as long-term accuracy, high degree of tolerance to heavy jamming and high dynamics.

FIELD OF THE PRESENT INVENTION

Background of the Present Invention

Although vehicle positioning systems have become widely known only during the last few decades, their historical roots go much deeper. The world's first vehicle positioning system was the "south-point-chariot", an automatic direction-keeping system developed by the Chinese around 200–300AD (possible earlier according to some legendary accounts), almost 1000 years before the magnetic compass was invented. Its operation was based on the phenomenon that as a vehicle changing heading, the outer wheels travel farther than the inner wheels by a distance that is a simple mathematical function of the change in heading. When changing heading, a gear driven by the outer wheel of the south-point chariot automatically engaged and rotated a horizontal turntable to exactly offset the change in heading. Thus, a figure mounted on the turntable continuously pointed an outstretched arm in the same direction, like a compass needle, regardless of which way the chariot turned. As technologies in positioning systems and in other fields are improved and expanded, Newsday, there are various types of the positioning system.

The new technology development in positioning system, which will lead to a low cost, small size, and high accurate positioning system, will have broad applications in the commercial community. The applications of vehicle positioning systems are spreading like wildfire, to car, taxi, busses, trains, robotics, to mining/construction, and to the paging and data portions of the personal communications services market as well as cellular emergency 911 service.

The ability to determinate vehicle location is the most fundamental requirement of advanced commercial vehicle tracking systems, automobile navigation and route guidance systems, and intelligent vehicle highway systems.

Developments of Intelligent vehicle highway systems are major worldwide movement to improve the efficiency, safety, and environmental aspects of road traffic through the application of information, communication, positioning, and control technologies.

Generally, some conventional methods for determining the position of a vehicle are to employ dead reckoning systems, radio positioning systems, and hybrid systems. The method of the present invention is a hybrid, fully fusion method for determining position and attitude of a vehicle.

A dead reckoning system based on inertial angular rate sensors and acceleration sensors can provide the position and attitude information of a vehicle. It consists of an inertial measurement unit (IMU) and a processor. The inertial measurement unit consists of three orthogonally or more than three skewed mounted accelerometers, which serve as acceleration sensors to measure the vehicle acceleration, and three orthogonally or more than three skewed mounted gyros, which serve as angular rate sensors to measure the vehicle angular rate, and associated hardware and electronics. These components provide the necessary information to stabilize the navigation reference frame for the purpose of providing isolation from vehicle rotation motions, either physically, in a gimbaled inertial system, or analytically, in a strapdown inertial system. The processor processes the platform's acceleration and angular rate from the inertial measurement unit. After initializing the starting position and initiating an alignment procedure, a continuous output of position, velocity, and attitude data from the processor is available, independent of any outside agency and environmental conditions.

The dead reckoning system based on inertial angular rate sensors and acceleration sensors, which is often referred to inertial navigation system, or inertial positioning system, or inertial reference system has the advantage, over all other positioning methods, that it is totally self-contained and that it outputs the full solution and that it offers wide bandwidth.

However, an inertial positioning system is expensive and subjects to drift over an extended period of time. This is primarily caused by its sensor error sources, such as gyro drift, accelerometer bias, and scale factor errors.

Generally, the ways of improving accuracy of inertial positioning systems include employing highly accurate inertial sensors and aiding an inertial positioning system using an external sensor.

The global positioning system (GPS) is a satellite-based, worldwide, all-weather radio positioning and timing system. The system is originally designed to provide precise position, velocity, and timing information on a global common grid system to an unlimited number of adequately equipped users.

A specific receiver is the key for a user to access the global positioning system. A conventional, single antenna receiver of the global positioning system supplies world-wide, highly accurate three dimensional position, velocity, and timing information, but not attitude, by processing so-called pseudo range and delta range measurements from the code tracking loops and the carrier tracking loops respectively. In a benign radio environment, the signal propagation errors and satellites errors, including selective availability, serve as the bounds for positioning errors the global positioning system. However, the signals of the global positioning system may be intentionally or unintentionally jammed or spoofed, and the receiver antenna may be obscured during vehicle attitude maneuvering, and the performance degrades when the signal-to-noise ratio of the global positioning system signal is low and the vehicle is undergoing highly dynamic maneuvers.

As both the cost and size of high performance receiver of the global position system are reduced in the past decade, a multiple-antenna receiver of the global positioning system can provide both position and attitude solution of a vehicle, using interferometric techniques. This technology utilizes measurements of carrier phase difference on the multiple-antenna to obtain highly accurate relative position measurements. Then, the relative position measurements are converted to the attitude solution. The advantages of this approach are long-term stability of the attitude solution and relative low cost. However, this system remains the characterization of low bandwidth and being susceptible to shading and jamming, and requires at least 3 antennas configurations for a three-axis attitude solution, and requires antenna separation enough for high attitude resolution.

Because of the inherent drawbacks of a stand-alone inertial positioning system and a stand-alone receiver of the global positioning system, a stand-alone inertial positioning system or a stand-alone receiver of the global positioning system can not meet mission requirements under some constraints such as low cost, long-term high accuracy, continuous output, etc.

Performance characteristics of the mutually compensating stand-alone global positioning system receiver and the stand-alone inertial positioning system suggest that, in many applications, an integrated global positioning/inertial system, combining the best properties of both systems, will provide superior accurate continuous navigation capability. This navigation capability is unattainable in either one of the two systems alone. Many public papers exist on the topic of an integrated global positioning/inertial positioning system. Numerous global positioning/inertial systems have been commonly used since the concept of the global positioning system was initiated in 1973.

The benefits offered by an integrated global positioning/inertial positioning system are outlined as follow:

(1) The aiding of the global positioning system receiver signal-tracking loop process with inertial data allows the effective bandwidth of the loops to be reduced, resulting in an improved tracking signal in a noisy and dynamic environment.

(2) An inertial positioning system not only provides navigation information when the signal of the global positioning system is lost temporarily, but also reduce the search time required to reacquire the signal of the global positioning system.

(3) Inertial positioning system errors and inertial sensor errors can be calibrated while the signal of the global positioning system is available, so that the inertial positioning system can provide more accurate position information after the signal of the global positioning system is lost.

(4) The global positioning system enables and provides on-the-fly alignment of an inertial positioning system by means of maneuvering, eliminating the static self-alignment pre-mission requirements of the stand-alone inertial positioning system.

But, the above mentioned benefits can not be achieved through any level of integration of global positioning/inertial system hardware and software. There are several possible levels of hardware and software integration configurations of global positioning/inertial system:

(1) The first integration approach, and also the simplest from an implementation viewpoint, is to reset the position and velocity derived by the inertial positioning system with the position and velocity derived by a global positioning system receiver.

(2) The second integration approach is called cascaded integration and is sometimes referred to as loose integration. It uses the position and velocity derived by a global positioning system receiver (the output of the Kalman filter of the global positioning system receiver) as measurements in an integration Kalman filter, hence the name "cascaded " (a Kalman filter driven by a Kalman filter).

(3) The third integration approach is called a tightly coupled global positioning/inertial positioning system. An integration Kalman filter processes the raw measurements (pseudo-range and delta range) of the global positioning system receiver to provide optimal inertial system error estimates, inertial sensor errors, and the receiver clock offset. The data from the inertial positioning system are used to aid the receiver signal tracking loops to improve the signal tracking performance in heavy jamming and highly dynamic environments.

The tightly coupled global positioning/inertial positioning system is an effort to more realize the above mentioned advantages offered potentially by an integrated global positioning/inertial positioning system.

Unfortunately, the conventional tightly coupled integration approach may be insufficient for achieving optimal performance of an integrated global positioning/inertial positioning system due to the minimal data exchange between the inertial positioning system and the global positioning system, and the potential instability, though it is commonly adopted to obtain improve performance.

The reasons for the potential instability in the conventional tightly coupled global positioning/inertial system approach include:

(1) The time constant of the inertial-aided tracking loops which uses a narrow bandwidth is much bigger than the update interval of the integration Kalman filter, and the inertial aiding errors are slowly filtered out. The tracking errors are time-correlated, and they are also correlated with the inertial errors, which are modeled by an integration Kalman filter. The statistic characteristic of the pseudo range and delta range measurements, which is disturbed by the tracking errors, is not compatible with measurement requirements of the integration Kalman filter.

(2) There is a positive feedback signal loop in the conventional tightly coupled global positioning/inertial systems. The accuracy degradation of the inertial aiding data increases the signal tracking errors. Because the measurements may severely affect the Kalman filter, which is well tuned for a low accuracy inertial positioning system, increasing the tracking errors fed to the global positioning/inertial processing may cause further inertial positioning system aiding data accuracy degradation.

In addition to the instability, conventional tightly coupled global positioning/inertial positioning methods can not efficiently detect and isolate the malfunction of the satellite of global positioning system, because the all measurements are processed in a centralized integration Kalman filter.

SUMMARY OF THE PRESENT INVENTION

A main objective of the present invention is to provide a full fusion positioning method, in which signals from the global positioning system, inertial angular sensors, and inertial acceleration sensors are processed in full fusion to obtain improved performance in some stress applications such as long-term accuracy, high degree of tolerance to heavy jamming and high dynamics, which can be implemented in the existing hardware, but is more amenable to the emerging wafer-scale integration hardware.

Another objective of the present invention is to provide a full fusion positioning method, in which an entirely digital, multistage signal/data processing procedure is employed.

Another objective of the present invention is to provide a full fusion positioning method, in which conventional phase locked loop-based signal tracking processing method of the global positioning system is replaced by the "tracking loops-in-all system" signal tracking processing method of the present invention. The signal tracking processing of the global positioning system is implemented in entire full fusion of the global positioning/inertial positioning system to overcome potential instability of traditional tightly coupled global positioning/inertial system and to enhance the signal tracking performance of the global positioning system during high dynamics and a heavy jamming environment.

Another objective of the present invention is to provide a full fusion positioning method, in which a maximum likelihood estimator provides the tracking errors of the pseudorange and delta range of the global positioning system receiver to the fusion filter to compensate the correlated noise of pseudorange and delta range measurements of the global positioning system receiver, while the optimal navigation solution provided by the full fusion method is used to compute the predicted pseudorange and delta range measurements of the global positioning system receiver to enclose the signal tracking process of the global positioning system.

Another objective of the present invention is to provide a full fusion positioning method, in which a dual-function fusion filter is used to fuse data of the global positioning system and inertial sensors and to perform the function of the GPS signal tracking loop filter.

Another objective of the present invention is to provide a full fusion positioning method, in which the dual-function fusion filter uses a parallel, decentralized Kalman filtering structure for reconfiguration, as a response to occurrences of malfunctions of satellites of the global positioning system.

Another objective of the present invention is to provide a full fusion positioning method, in which multi-level fault tolerance design is employed to improve reliability of the full fusion positioning solution.

Another objective of the present invention is to provide a full fusion positioning method, in which multi-level fault tolerance design is employed to perform the integrity monitoring of the global positioning system.

Accordingly, in order to accomplish the above objectives, the present invention provides a full fusion positioning method which comprises the steps of:

(a) injecting a global positioning system signal received by a global positioning system antenna and a predicted pseudorange and delta range from a data fusion, and converting and tracking said global positioning system signal to obtain pseudorange and delta range measurement and errors of said pseudorange and delta range measurement, which are passed to said data fusion;

(b) receiving a vehicle angular rate and an acceleration signal/data from an inertial measurement unit and solving inertial navigation equations for obtaining a referencing navigation solution, including position, velocity, and attitude, which are passed to a data fusion; and (c) fusing said pseudorange and delta range measurement and said errors of said pseudorange and delta range measurement of said global positioning system and said referencing navigation solution to obtain predicted pseudorange and delta range, optimal estimates of said referencing navigation solution errors and inertial sensor errors, and optimal position information.

DETAILED DESCRIPTION OF THE PREFERRED EMBODIMENT

The present invention relates to a full fusion method of signals of the global positioning system and inertial sensors for continuously determining the position of a vehicle. Referring to FIGS. 1 to 6, the full fusion positioning method for vehicle of the present invention comprises the following steps.

1. Inject global positioning system signal received by a global positioning system antenna 5 for converting and pre-processing the received radio frequency signal of the global positioning system to obtain the global positioning system measurement data, such as pseudorange and delta range measurements, which are passed to a data fusion 80.

2. Receive the vehicle angular rate and acceleration signal/data measured by an inertial measurement unit 10 and solve inertial navigation equations for obtaining a referencing navigation solution, such as position, velocity, and attitude, and pass the referencing positioning solution to the data fusion 80.

3. Fuse the measurement data of the global positioning system and the referencing navigation solution to obtain an optimal fusing positioning solution.

To obtain improved performance, in step 1, the signal tracking processing of the global positioning system is implemented in open-loop, and is enclosed in the data fusion 80 to improve degree of tolerance to heavy jamming and high dynamics.

To obtain improved performance, in step 2, the optimal estimates of errors of the referencing navigation solution from the data fusion 80 is used to remove the errors of the referencing navigation solution.

Figure 1:
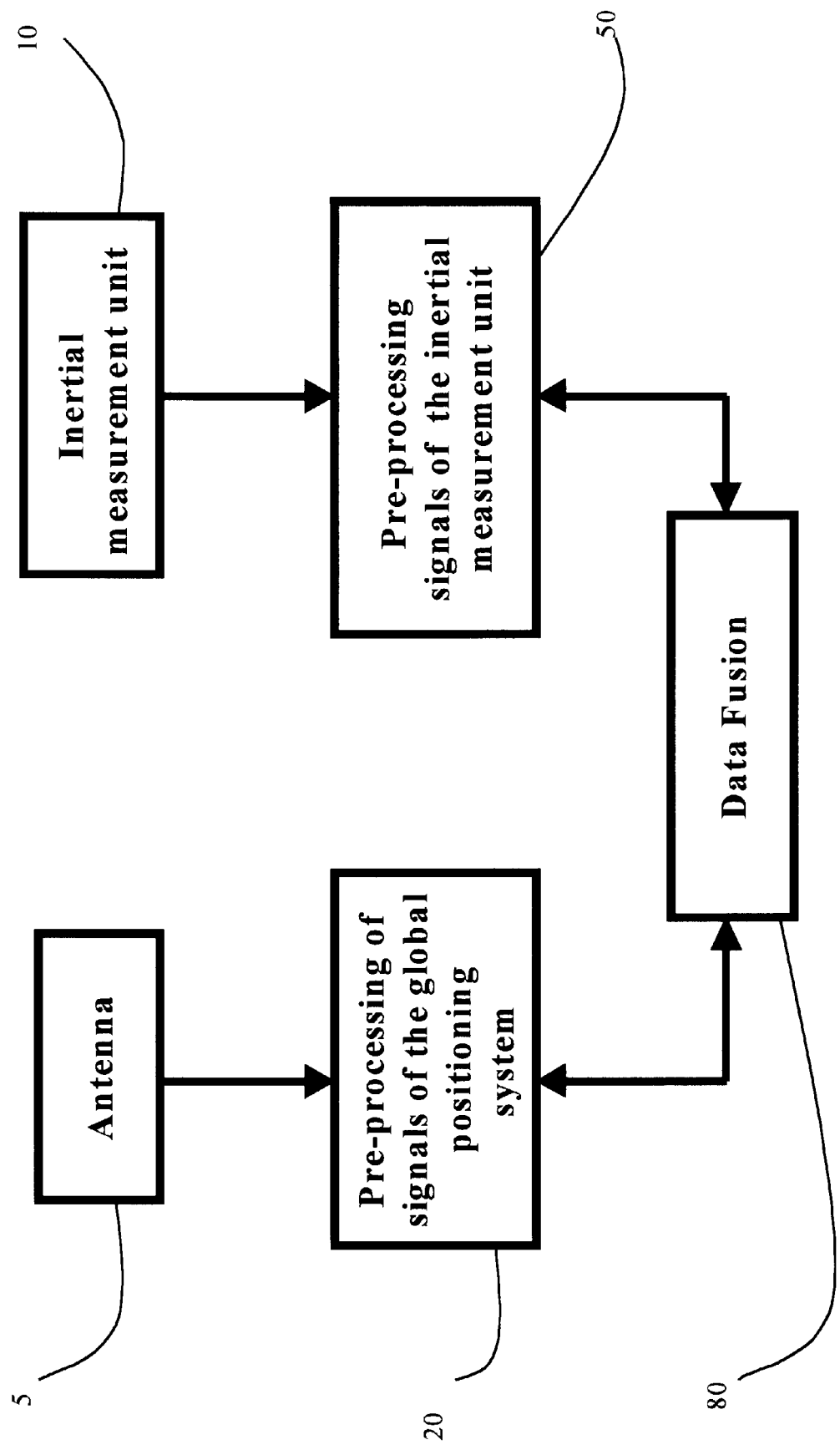
FIG. 1 is a block diagram illustrating a full fusion positioning method for vehicle.
Figure 2:
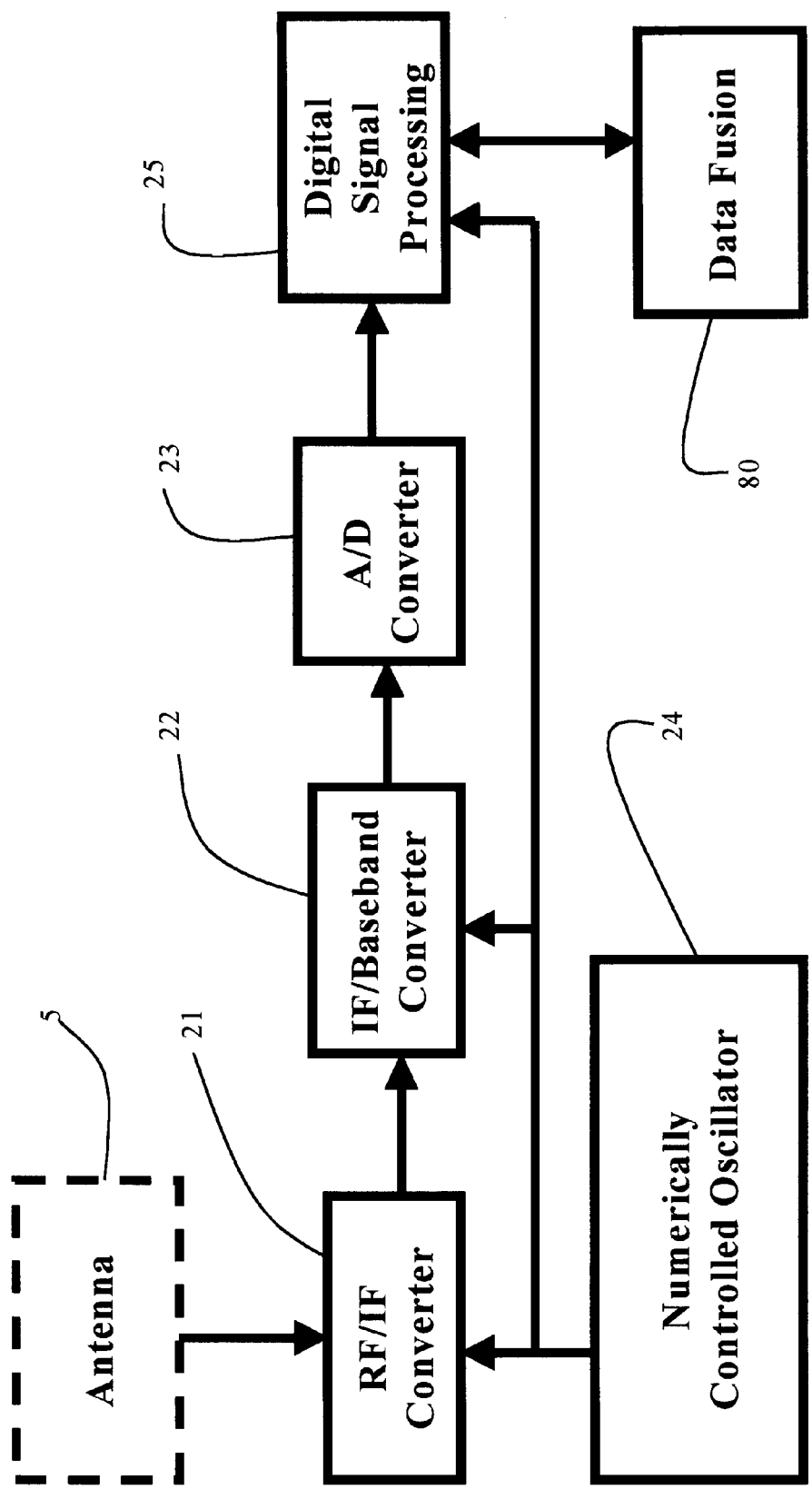
FIG. 2 is a block diagram illustrating the pre-processing of signals of the global positioning system.

Referring to FIG. 2, the step 1 further comprises the following steps.

(1-1) The L band radio frequency (RF) signals received by the global positioning system antenna 5 are input to a RF/IF converter 21. The input RF signals are mixed with the local signals from the local numerically controlled oscillator 24. Then, the mixed signals are band-pass filtered into the Intermediate Frequency (IF) signals. The IF signals are sent to the IF/baseband converter 22.

The global positioning system satellites transmit the radio frequency (RF) coarse acquisition (C/A) signal and precision (P) at L1 band. The ith global positioning system satellite transmits the L1 signal as follows.

$$S_i^{L1}(t) = \sqrt{2P_c}CA(t)_iD(t)_i\cos(\omega_1 t+\phi) + \sqrt{2P_p}P(t)_iD(t)_i\sin(\omega_1 t+\phi)$$

Where, $\omega_1$: the L1 radian carrier frequency.

$\phi$: a small phase noise and oscillator drift component.

$P_c$: the C/A signal power.

$P_p$: the P signal power.

CA(t): the C/A code.

P(t): the P code.

D(t): the navigation data.

The global positioning system satellites transmit the radio frequency signal and precision (P) at L2 band. The ith global position system satellite transmits the L2 signal as follows.

$$S_i^{L2}(t) = \sqrt{2P_2}P(t)_i D(t)_i \cos(\omega_2 + \phi_2),$$

where, $\omega_2$: the L2 radian carrier frequency.

$P_2$: the L2-P signal power.

$\phi_2$: a small phase noise and oscillator drift component

P(t): the P code.

D(t): the navigation data.

These signals travel at the speed of light and arrive at the antenna of the global position system receiver, as follows:

L1:
$$S_i^{L1}(t) = \sqrt{2P_c}\, CA_i(t-\tau_i)D_i(t)\cos[(\omega_1+\omega_{id})t+\phi] + \sqrt{2P_p}\, P_i(t)D_i(t)\sin[(\omega_1+\omega_{id})t+\phi]$$

L2:
$$S_i^{L2}(t) = \sqrt{2P_2}\, P_i(t-\tau_i)D_i(t)\cos[(\omega_2+\omega_{id})t+\phi_2],$$

where, $\tau$: the code delay.

$\omega_d$: the Doppler radian frequency.

i: i th satellite of the global positioning system.

The global positioning system signals received by the antenna 5 is sent to the RF/IF converter 21 of the preprocessing of the global positioning system 20.

(1-2) The IF signals from the RF/IF converter 21 are received by the IF/baseband converter 22. The IF signals are mixed with the local signals from the local numerically controlled oscillator 24. Then, the mixed signals are amplified, low-pass filtered, and transformed onto baseband signals. The bandwidth of the low-pass (LP) filter is 1.023 MHz, for the C/A code channels, and 10.23 MHz, for the P code channels. The baseband signals are sent to the A/D converter 23.

(1-3) The baseband signals form the IF/Baseband converter 22, which are analog signals, are received by the A/D converter 23. The analog baseband signals are sampled to form digital signals, with sampling rates approximately twice as those of the pseudo-random noise (PRN) code (2.1518 MHz for the C/A code signal and 21.5 18 MHz or the P code signals). The digital signals are output to the baseband processor 25. The L1C/A digital signal ith satellite from the A/D converter 23 is $$r_i(n) = A_i CA_i[(1+\zeta_i)nT_s - \xi_i T_P]\cos[(\omega_b+\omega_{id})n+\phi_0] + N(n)$$

where,

A: the signal amplitude.

CA[.]: a ±1-valued PRN code with rate, R, delayed by $\tau = \xi T_p$, with respect to GPS system time ($T_P$ is the code chip width). The code rate is equal to $(1+\zeta)R_0$, where $$\zeta = \frac{f_d}{f_L}$$

and $F_L$ is the RF frequency, and $R_0$ is the code rate without the Doppler shift.

$T_s$: the sampling period.

$\omega_b$: $2\pi f_b T_s$, is the digital radial frequency of the baseband frequency, $f_b$.

$\omega_d$: $2\pi f_d T_s$, is the digital radial frequency of Doppler shift, $f_d$.

$\phi_0$: the initial carrier phase at n=0.

N(n): the equivalent input Gaussian noise at base-band.

Figure 3:
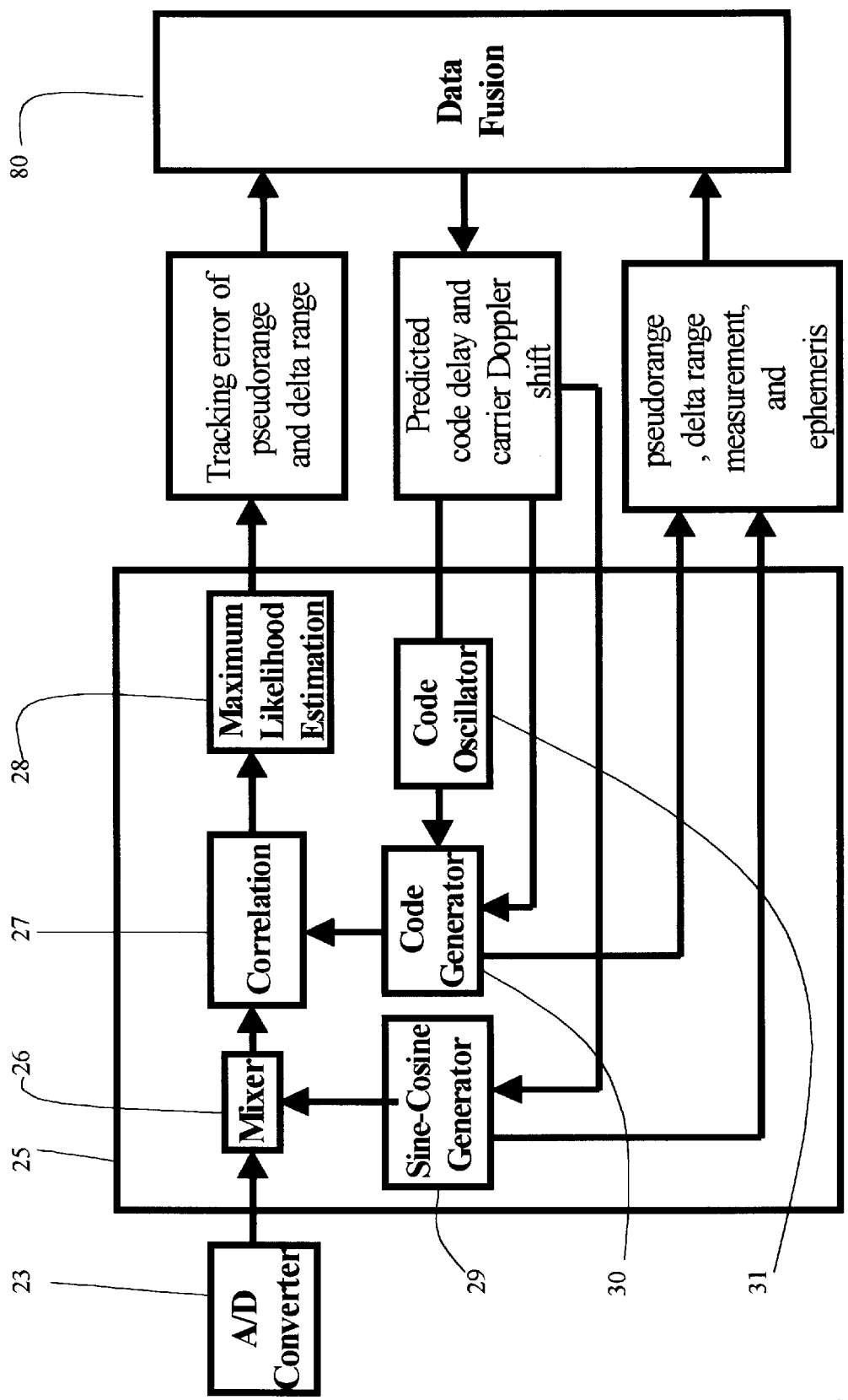
FIG. 3 is a block diagram illustrating the digital signal processing of the pre-processing of signals of the global positioning system.

(1-4) Referring to FIGS. 2 and 3) the digital baseband signals from the A/D converter 23 and the predicted code delay and carrier Doppler shift from the data fusion 80 are received by the digital signal processing 25, and are used to derive the pseudorange and delta range measurements, and the tracking errors of the pseudorange and delta range for each tracked satellite, which are input to the data fusion 80.

The local reference signals provided by the numerically controlled oscillator 24 are input to the RF/IF converter 21, IF/baseband converter 22, and the digital signal processing 25.

Referring to FIG. 3, the digital signals from the (A/D) converter 23 are received by the Mixer 26, and are mixed with the local in-phase(I) and quadraphase (Q) from the sine-cosine generator 29. The mixed local in-phase(I) and quadraphase (Q) are output to the correlation 27.

The mixed local in-phase (I) and quadraphase (Q) from the mixer 26 and local code from the code generator 30 are received by the correlation 27, and are used to perform correlation computation. The results of the correlation computation are output to the Maximum-Likelihood Estimator 28.

N samples of the results of the correlation computation from the correlation are collected by the Maximum Likelihood Estimation 28. Assuming that the tracking errors of the code delay and the carrier Doppler shift are constant quantities over a small observation interval, the maximum likelihood estimates of the code delay and carrier phase Doppler shift are made by the Maximum Likelihood Estimation 28, and are transformed to the tracking errors of the pseudorange and delta range respectively, which are sent to the data fusion 80.

The predicted carrier Doppler shift from the data fusion 80 is accepted by the code oscillator 31, and is used to compute code rate. The generated PRN(pseudo random noise) code with the computed rate is input to the code generator 30.

The PRN code with the computed rate from the code oscillator 31 and the predicted code delay from the data fusion 80 are accepted by the code generator 30, and are used to generate the local prompt code, which is sent to the correlation 27, and to compute pseudorange measurements, which are output to the data fusion 80, and to perform demodulation of satellite ephemeris, which are output to the data fusion 80.

The predicted carrier Doppler from the data fusion 80 are received by the sine-cosine generator 29, and are used to generate the local I and Q signals, which are sent to the mixer 26, and to compute delta range measurements, which are sent to the data fusion 80.

Figure 4:
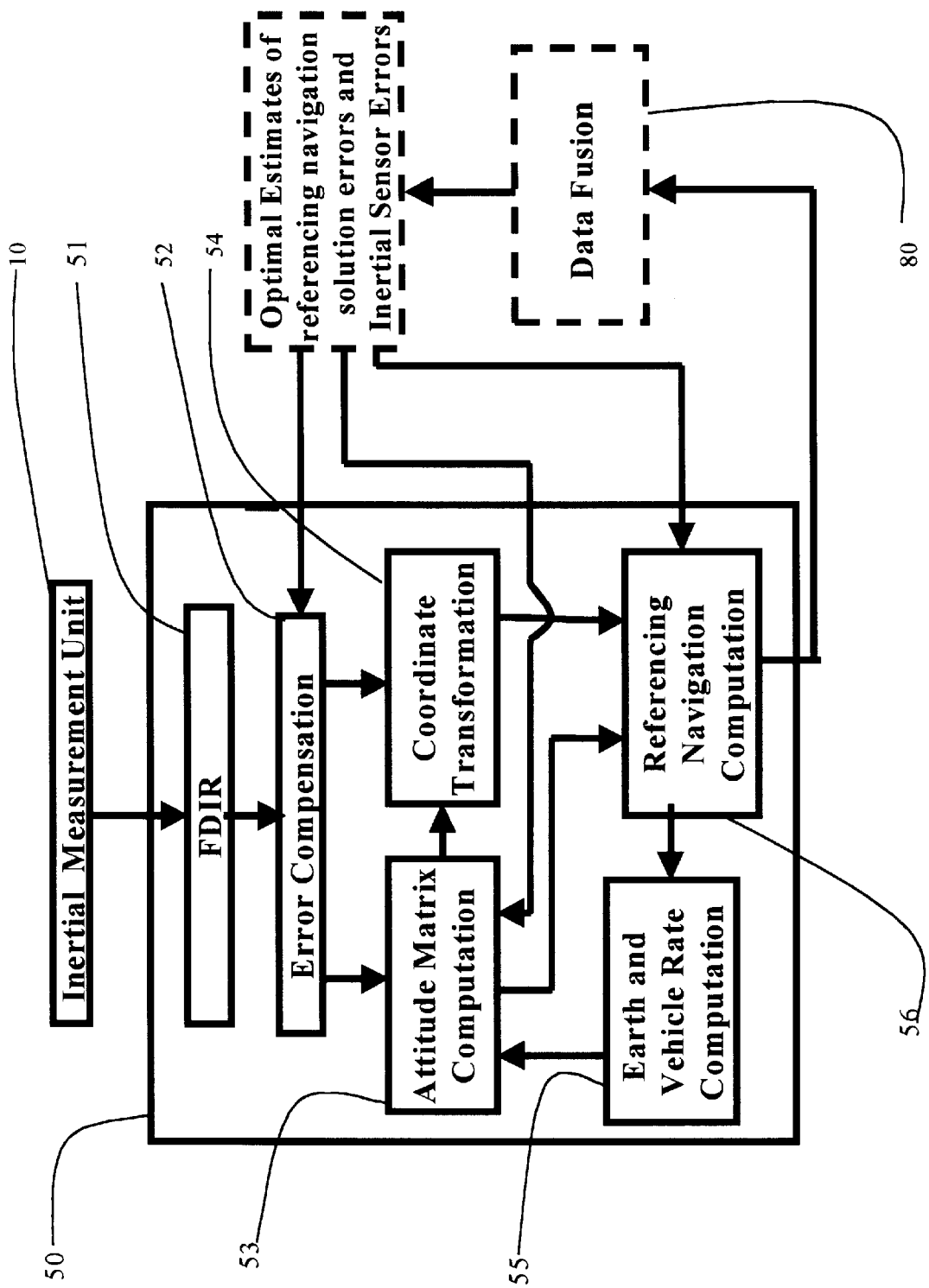
FIG. 4 is a block diagram illustrating the pre-processing of signals of the inertial measurement unit.

Referring to FIG. 4, the step 2 has two operational modes:

(1) Feedback compensation;

(2) Feedforward compensation.

The vehicle angular rate and acceleration information can be provided by the following two types of inertial measurement unit:

1) The inertial measurement unit comprises three orthogonally mounted gyros and three orthogonally mounted accelerometers to output three axis angular rates and accelerations;

2) The inertial measurement unit comprises more than three skewed mounted gyros and more than three skewed mounted accelerometers to output redundant angular rates and accelerations.

Therefore, the step 2 further can be implemented by the following options:

2(A) The pre-processing of the inertial measurement unit 50 is implemented in the feedback compensation mode. The threes axis angular rates and accelerations from the inertial measurement unit with three orthogonally mounted gyros and three orthogonally mounted accelerometers and the optimal estimates of inertial sensor errors from the data fusion 80 are input to the error compensation 54 are input to the error compensation 52 of the pre-processing of the inertial measurement unit 50.

The errors of the three axis angular rates and accelerations are compensated with the optimal estimates of inertial sensor errors. The compensated three axis angular rates are output to the attitude matrix computation 53, and the compensated three axis accelerations are output to the coordinate transformation 54.

The compensated vehicle angular rates from the error compensation 52, the rotation rate vector of the local navigation frame (n frame) relative to the inertial frame (i frame) from the earth and vehicle rate computation 26, and the optimal estimates of referencing navigation solution errors from the data fusion 80 are received by the attitude matrix computation 53, and are used to perform the update of a attitude matrix from the body frame (b frame) to the navigation frame (n frame) and to remove the error of the attitude matrix. The obtained attitude matrix is output to the coordinate transformation 54 and the referencing navigation computation 56

The way to update the attitude matrix is the Euler method, or the direction cosine method, or the quaternion method.

The compensated accelerations from the error compensation 52, which are expressed in the body frame, and the attitude matrix from the attitude matrix computation 53 are accepted by the coordinate transformation 54 and are used to transform the acceleration expressed in the body frame to the acceleration expressed in the navigation frame. The accelerations expressed in the navigation frame are output to the referencing navigation computation 56.

The acceleration expressed in the navigation frame from the coordinate transformation 54, and the attitude matrix obtained from the attitude matrix computation 53, and the optimal estimates of the referencing navigation errors from the data fusion 80 are received by the referencing navigation computation 56, and are used to compute the referencing position, velocity, and attitude, and to remove the errors of the position and velocity solution. The referencing navigation solution such as position, velocity, and attitude are output to the Earth and vehicle rate computation 55 and the data fusion 80.

The referencing navigation solution from the referencing navigation computation 56 are received by the Earth and vehicle rate computation 55, and are used to compute the rotation rate vector of the local navigation frame (n frame) relative to the inertial frame (i frame), which is output to the attitude matrix computation 53.

2(B) The pre-processing of the inertial measurement unit 50 is implemented in the feedforward compensation mode. The threes axis angular rates and accelerations from the inertial measurement unit with three orthogonally mounted gyros and three orthogonally mounted accelerometers are input to the pre-processing of the inertial measurement unit 50. The input three axis angular rates are output to the attitude matrix computation 53, and the input three axis accelerations are output to the coordinate transformation 54.

The input vehicle angular rates from the inertial measurement unit 10 and the rotation rate vector of the local navigation frame (n frame) relative to the inertial frame (i frame) from the earth and vehicle rate computation 26 are received by the attitude matrix computation 53, and are used to perform the update of a attitude matrix from the body frame (b frame) to the navigation frame (n frame). The obtained attitude matrix is output to the coordinate transformation 54 and the referencing navigation computation 56

The way to update the attitude matrix is the Euler method, or the direction cosine method, or the quaternion method.

The input accelerations from the inertial measurement unit 10, which are expressed in the body frame, and the attitude matrix obtained from the attitude matrix computation 53 are accepted by the coordinate transformation 54 and are used to transform the acceleration expressed in the body frame to the acceleration expressed in the navigation frame. The accelerations expressed in the navigation frame are output to the referencing navigation computation 56.

The input acceleration expressed in the navigation frame from the coordinate transformation 54 and the updated attitude matrix from the attitude matrix computation 53 are received by the referencing navigation computation 56, and are used to compute the referencing position, velocity, and attitude. The referencing navigation solution such as position, velocity, and attitude are output to the Earth and vehicle rate computation 55 and the data fusion 80.

The referencing navigation solution from the referencing navigation computation 56 are received by the Earth and vehicle rate computation 55, and are used to compute the rotation rate vector of the local navigation frame (n frame) relative to the inertial frame (i frame), which is output to the attitude matrix computation 53.

2(c) The pre-processing of the inertial measurement unit 50 is implemented in the feedback compensation mode. The redundant angular rates and accelerations from the inertial measurement unit with more than three skewed mounted gyros and more than three skewed mounted accelerometers and the optimal estimates of inertial sensor errors from the data fusion 80 are input to the FDIR 51 the pre-processing of the inertial measurement unit 50, and used to perform failure detection, isolation and recovery processing on the input the redundant angular rates and accelerations to obtain reliable three axis angular rates and accelerations. The obtained three axis angular rates and accelerations are output to the error compensation 54.

The obtained three axis angular rates and accelerations from the FDIR 51 and the optimal estimates of inertial sensor errors from the data fusion 80 are input to the error compensation 54. The errors of the three axis angular rate and acceleration are compensated with the optimal estimates of inertial sensor errors. The compensated three axis angular rates are output to the attitude matrix computation 53, and the compensated three axis accelerations are output to the coordinate transformation 54.

The compensated vehicle angular rates from the error compensation 52, and the rotation rate vector of the local navigation frame (n frame) relative to the inertial frame (i frame) from the earth and vehicle rate computation 26 and the optimal estimates of referencing navigation solution errors from the data fusion 80 are received by the attitude matrix computation 53, and are used to perform the update of a attitude matrix from the body frame (b frame) to the n frame and to remove the error of the attitude matrix. The obtained attitude matrix is output to the coordinate transformation 54 and the referencing navigation computation 56

The way to update the attitude matrix is by the Euler method, or the direction cosine method, or the quaternion method.

The compensated accelerations from the error compensation 52, which are expressed in the body frame, and the attitude matrix obtained from the attitude matrix computation 53 are accepted by the coordinate transformation 54 and are used to transform the acceleration expressed in the body frame to the acceleration expressed in the navigation frame. The accelerations expressed in the navigation frame are output to the referencing navigation computation 56.

The acceleration expressed in the navigation frame from the coordinate transformation 54, and the attitude matrix obtained from the attitude matrix computation 53, and the optimal estimates of inertial sensor errors from the data fusion 80 are received by the referencing navigation computation 56, and are used to compute the referencing position, velocity, and attitude, and to remove the errors of the position and velocity solution. The referencing navigation solution such as position, velocity, and attitude are output to the Earth and vehicle rate computation 55 and the data fusion 80.

The referencing navigation solution from the referencing navigation computation 56 are received by the Earth and vehicle rate computation 55, and are used to compute the rotation rate vector of the local navigation frame (n frame) relative to the inertial frame (i frame), which is output to the attitude matrix computation 53.

2(d) The pre-processing of the inertial measurement unit 50 is implemented in the feedforward compensation mode. The redundant angular rates and accelerations from the inertial measurement unit from the inertial measurement unit with more than three skewed mounted gyros and more than three skewed mounted accelerometers are input to the FDIR 51 of the pre-processing of the inertial measurement unit 50, and used to perform failure detection, isolation and recovery processing on the input the redundant angular rates and accelerations to obtain reliable three axis angular rates and accelerations. The obtained reliable three axis angular rates are output to the attitude matrix compensation 53. The obtained reliable three axis accelerations are output to the coordinate transformation 54.

The input vehicle angular rates from the FDIR and the rotation rate vector of the local navigation frame (n frame) relative to the inertial frame (i frame) from the earth and vehicle rate computation 26 are received by the attitude matrix computation 53, and are used to perform the update of a attitude matrix from the body frame (b frame) to the navigation frame (n frame). The attitude matrix is output to the coordinate transformation 54 and the referencing navigation computation 56

The way to update the attitude matrix is the Euler method, or the direction cosine method, or the quaternion method.

The input accelerations from the FDIR 10, which are expressed in the body frame, and the attitude matrix obtained from the attitude matrix computation 53 are accepted by the coordinate transformation 54 and are used to transform the acceleration expressed in the body frame to the acceleration expressed in the navigation frame. The accelerations expressed in the navigation frame are output to the referencing navigation computation 56.

The input acceleration expressed in the navigation frame from the coordinate transformation 54 and the updated attitude matrix from the attitude matrix computation 53 are received by the referencing navigation computation 56, and are used to compute the referencing position, velocity, and attitude. The referencing navigation solution such as position, velocity, and attitude are output to the Earth and vehicle rate computation 55 and the data fusion 80.

The referencing navigation solution from the referencing navigation computation 56 are received by the Earth and vehicle rate computation 55, and are used to compute the rotation rate vector of the local navigation frame (n frame) relative to the inertial frame (i frame), which is output to the attitude matrix computation 53.

Figure 5:
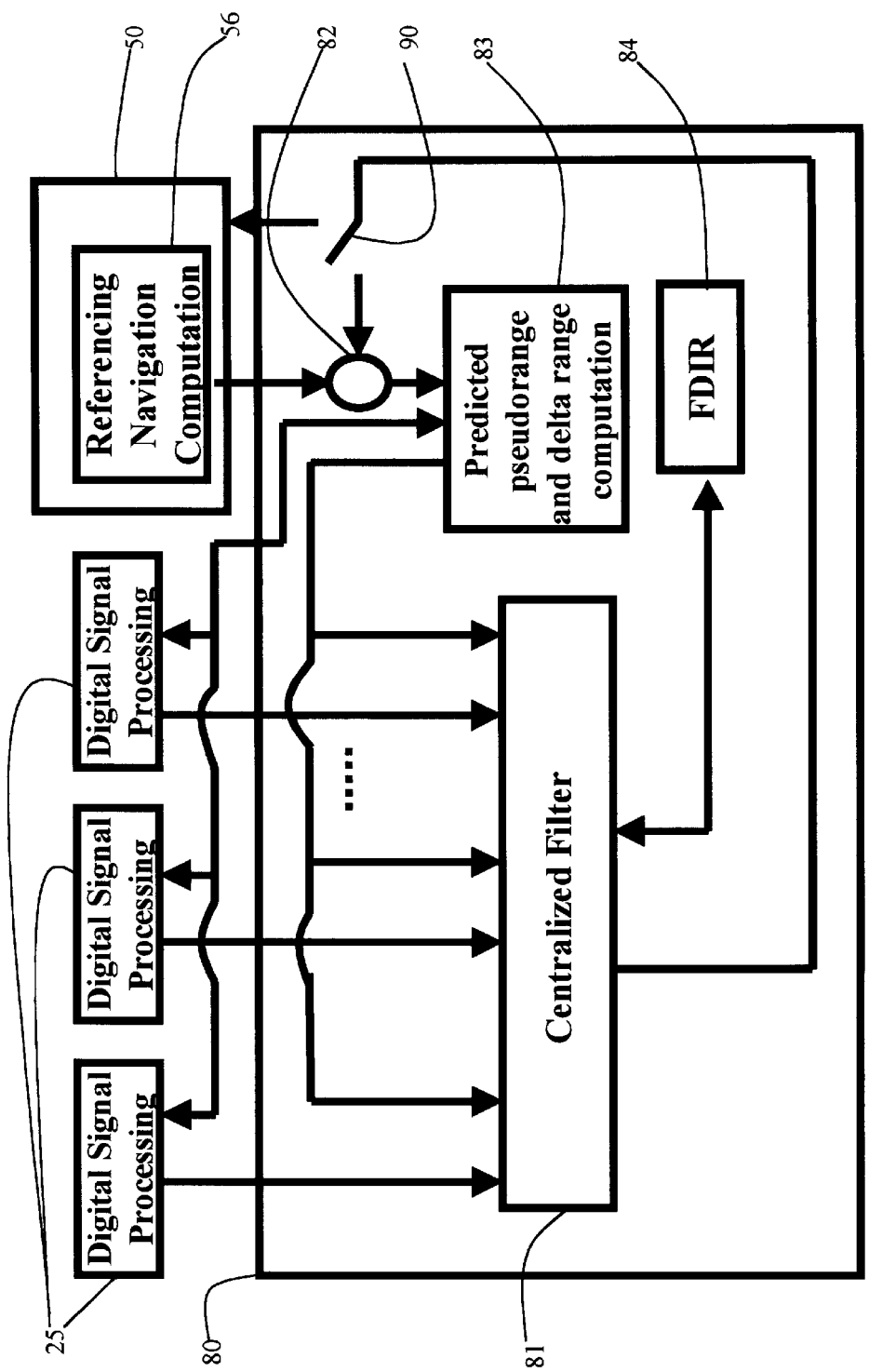
FIG. 5 is a block diagram illustrating the approach 1 of the data fusion.
Figure 6:
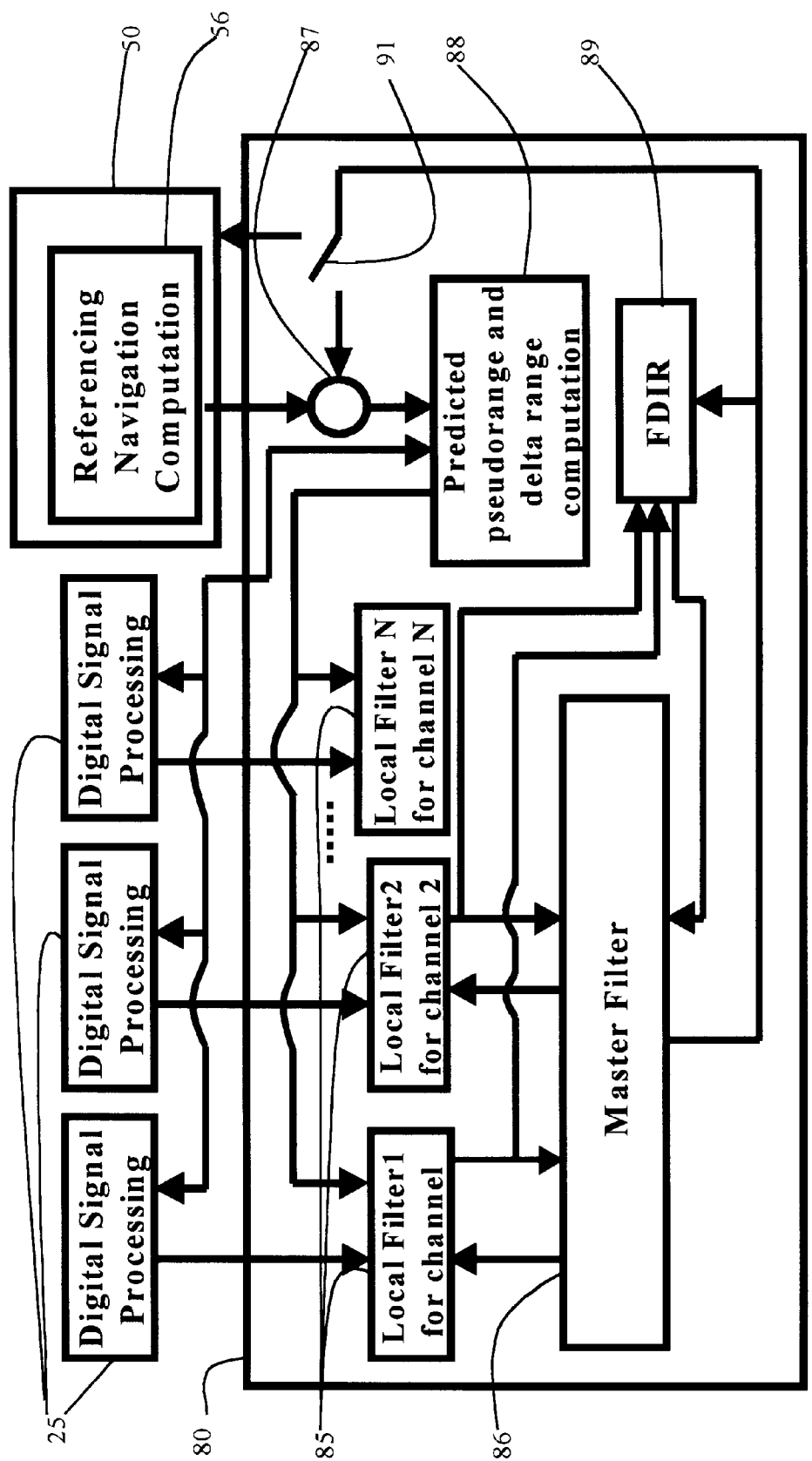
FIG. 6 is a block diagram illustrating the approach 2 of the data fusion.

Referring to FIGS. 5 and 6, the step 3 has two approaches:
3(A) centralized Kalman filter-based approach
3(B) decentralized Kalman filter-based approach, such as Federated Kalman filter.

Referring to FIGS. 5 and 6, the step 3(a) further comprises the following steps:

3(a)-1. Referring to FIG. 5, If the pre-processing of inertial measurement unit 50 is implemented in the feedback compensation mode, the switcher 90 is closed to the pre-processing of inertial measurement unit 50. The referencing navigation solution from the pre-processing of inertial measurement unit 50, which is compensated with the feedback optimal estimates of the errors of the referencing navigation solution from the centralized filter 81, is accepted by the subtractor 82 and is passed to the predicted pseudorange and delta range computation 83, and is output as the full fusion positioning solution.

If the pre-processing of inertial measurement unit 50 is implemented in the feedforward compensation mode, the switcher 90 is closed to the subtractor 82. The referencing navigation solution from the pre-processing of inertial measurement unit 50 and the optimal estimates of the errors of the referencing navigation solution from the centralized filter 81 is accepted by the subtractor 82 and are used to compensate the errors of the referencing navigation solution with and the optimal estimates of the errors of the referencing navigation solution from the centralized filter 81. The compensated referencing navigation solution is passed to the predicted pseudorange and delta range computation 88 and are output as full fusion positioning solution.

The satellite ephemeris from each digital signal processing 25 of each tracked satellite channel, the referencing navigation solution from the substractor 90, and the optimal estimates of receiver clock offset and offset rate of the global positioning system are accepted by the predicted pseudorange and delta range computation 83.

The predicted pseudorange and delta range for each tracked satellite channel is calculated from: the global positioning system satellite position and velocity, the position and velocity of the inertial measurement unit, the Kalman estimated receiver clock offset and offset rate, the deterministic clock correction of the global positioning system satellite, and the computed atmospheric delays.

The predicted pseudorange and delta range for each tracked satellite channel is output to the centralized filter 81, and is transformed to the predicted code delay and carrier Doppler shift of the global positioning system signal, which is output to the digital signal processing 25 of each tracked satellite channel to enclose each signal tracking loop of the global positioning system receiver.

3(a)-2. The dynamics of the referencing navigation parameter errors such as 3 position errors, 3 velocity errors 3 attitude errors, and inertial sensor errors such as accelerometer measurement errors, gyro measurement errors, and receiver clock errors are modeled by the centralized filter as follows:

$$X(t)=F(t)X(t)+G(t)W(t)$$

The measured pseudorange and delta range measurement and tracking error of the pseudorange and delta range measurement from the digital signal processing 25 for all tracked satellite channel, the predicted pseudorange and delta range measurement for all tracked satellite channels and satellite ephemeris and the referencing inertial navigation solution from the predicted pseudorange and delta range computation 83 are output to the centralized filter 81, and used to perform the following steps:

Updating the parameters of the system and measurement equations;

Computing the parameters for discrete model of the system equation;

Computing the parameters for the linear model of the measurement equation;

Computing the time propagation of the state estimation and covariance matrix;

Differencing the measured pseudorange and delta range measurement with the predicted pseudorange and delta range measurement. The differences are compensated with the tracking error of the pseudorange and delta range measurement and are used as the measurements of the centralized filter 81.

Computing measurement residuals;

Updating the state estimation and covariance matrix;

The updated state estimation is output to the substractor 82 and the pre-processing of inertial measurement unit 50.

3(a)-3. The measurement residuals from the centralized filter 81 are input to the FDIR 84, and are used to perform the test-statistical distribution of the input measurement residuals to detect and isolation possible failure of the input pseudorange and delta range measurements caused by the malfunction of the satellite of the global positioning system. If a failure is detected, an indication of the malfunction satellite is output by the FDIR to the centralized filter 81 to isolate the malfunction or update the centralized filter 81.

3(b)-1. Referring to FIG. 6, If the pre-processing of inertial measurement unit 50 is implemented in the feedback compensation mode, the switcher 90 is closed to the pre-processing of inertial measurement unit 50. The referencing navigation solution from the pre-processing of inertial measurement unit 50, which is compensated with the feedback optimal estimates of the errors of the referencing navigation solution from the master 86, is accepted by the subtractor 87 and is passed to the predicted pseudorange and delta range computation 88, and is output as the full fusion positioning solution.

If the pre-processing of inertial measurement unit 50 is implemented in the feedforward compensation mode, the switcher 91 is closed to the subtractor 87. The referencing navigation solution from the pre-processing of inertial measurement unit 50 and the optimal estimates of the errors of the referencing navigation solution from the master filter 86 are accepted by the subtractor 87 and are used to compensate the errors of the referencing navigation solution with and the optimal estimates of the errors of the referencing navigation solution from the master filter 86. The compensated referencing navigation solution is passed to the predicted pseudorange and delta range computation 88 and are output as full fusion positioning solution.

The satellite ephemeris from each digital signal processing 25 of each tracked satellite channel, the referencing navigation solution from the referencing navigation computation 56 from the substractor 91, and the optimal estimates of receiver clock offset and offset rate of the global positioning system from the master filter 86 are accepted by the predicted pseudorange and delta range computation 88.

The predicted pseudorange and delta range for each tracked satellite channel is calculated from: the global positioning system satellite position and velocity, the position and velocity of the inertial measurement unit, the Kalman estimated receiver clock offset and offset rate, the deterministic clock correction of the global positioning system receiver, and the computed atmospheric delays.

The predicted pseudorange and delta range for each tracked satellite channel is output to the local filter 85 for the corresponding tracked satellite channel, and is transformed to the predicted code delay and carrier Doppler shift, which is output to the digital signal processing 25 of each tracked satellite channel to enclose each signal tracking loop of the global positioning system receiver.

3(b)-2. The dynamics of the referencing navigation parameter errors such as 3 position errors, 3 velocity errors 3 attitude errors, and inertial sensor errors accelerometer measurement errors, gyro measurement errors, and receiver clock errors are modeled by each local filter 85 as follows:

$$X(t)=F(t)X(t)+G(t)W(t)$$

The measured pseudorange and delta range measurement from the digital signal processing 25, the predicted pseudorange and delta range measurement from the predicted pseudorange and delta range computation 88 for each tracked satellite channel, and satellite ephemeris and the referencing inertial navigation solution from the predicted pseudorange and delta range computation 88 are output to the local filter 85, and the following steps are performed in each local filter 85:

Updating the parameters of the system and measurement equations;

Computing the parameters for discrete model of the system equation;

Computing the parameters for the linear model of the measurement equation;

Computing the time propagation of the local state estimation and covariance matrix;

Differencing the measured pseudorange and delta range measurement with the predicted pseudorange and delta range measurement for each tracked satellite channel. The difference are compensated with the tracking error of the pseudorange and delta range measurement and are used as the measurement of the local filter 85 of corresponding tracked satellite channel.

Computing measurement residuals;

Updating the local state estimation and covariance matrix;

The updated local state estimation and covariance matrix are output to the master filter 86 and the FDIR 89.

3(b)-3. The local state estimation and covariance matrix from each local filter 85 is input to the master filter 86, and is used to perform fusion processing to obtain global optimal state estimates. The obtained global optimal state estimates are output to the FDIR 89 and switcher 91.

The global optimal state estimation, which includes optimal estimates of inertial navigation solution errors, the global position system receiver errors, and the inertial sensor errors, and the covariance matrix obtained from the master filter 86 are fed back to each local filter 85 to reset the local filter 85, and are used to perform information-sharing among the master filter 85 and each local filter 85.

To obtain different system performance, the communication between the master filter 85 and each local filter 85 and estimation method used in the master filter 85 and each local filter may have different approaches.

3(b)-4. The local state estimation and covariance matrix from each the local filter 85 and the global optimal state estimation and covariance from the master filter 86 are received by the FDIR 89, and are used to perform consistency test to detect and isolation possible failure of the input pseudorange and delta range measurements caused by malfunction of the satellite of the global positioning system. If a failure is detected, an indication of the malfunction satellite is output by the FDIR 89 to the master filter 86 to configure the master filter 86 to isolate the malfunction.

The performance of the FDIR 89 in the approach 3(b) is better than that of the FDIR 84 in the approach 3(a) to facilitate global positioning system integrity monitoring because the approach 3(b) provides a parallel filtering structure.

Integrity means the system's ability to provide timely warnings to users to shut down operations. The one concern is the possibility that a malfunction of the global may transmit an erroneous navigation signal to the global positioning system receiver. It is required that a malfunction of the global positioning system be detected within 10 s of the time at which the navigation accuracy is outside the defined alarm limits. Unfortunately, the Control Segment of the global positioning system can not react to malfunctions of the global positioning system within this time frame. Typically, it takes the Control Segment from 15 min to 2 hours to determine that there is a problem, identify it, determine a course of corrective action, and implement that action.

What is claimed is:

1. A full fusion positioning method, comprising the steps of:
    (a) receiving Global Positioning System (GPS) signals by a GPS receiver, which are Radio Frequency (RF) signals, within a current epoch for a carrier by a GPS antenna carried by said carrier and previous predicted pseudorange and delta range measurements for a previous epoch from a data fusion device carried by said carrier, and converting and tracking said GPS signals by using said GPS signals and said previous predicted pseudorange and delta range measurements to obtain a pseudorange and delta range measurements and tracking errors of said pseudorange and delta range measurements, which are passed to said data fusion device;
    (b) producing an angular rate and an acceleration data for said carrier by an Inertial Measurement Unit (IMU) carried by said carrier within said current epoch, receiving optimal estimate of navigation solution errors and IMU errors for said previous epoch from said data fusion device, and solving inertial navigation equations by using said angular rate and said acceleration data to obtain a referencing navigation solution of said carrier, including position, velocity and attitude of said carrier, for said current epoch, which are passed to said data fusion device; and
    (c) fusing said pseudorange measurement and delta range measurements, said tracking errors of said pseudorange and delta range measurements, and said referencing navigation solution for said current epoch, so as to:
        produce current predicted pseudorange and delta range measurements for said current epoch;
        produce optimal estimate of said referencing navigation solution errors and IMU errors for said current epoch and optimal estimate of clock offset and offset rate of said GPS receiver for said current epoch;
        remove said errors of said referencing navigation solution using said optimal estimate of said referencing navigation solution errors and IMU errors to provide a corrected navigation solution; and
        output said corrected navigation solution of said carrier.

2. A full fusion positioning method, as recited in claim 1, before the step (a), further comprising an initialization step of:
    providing an initial predicted pseudorange and delta range measurements for an initial epoch wherein said initial predicted pseudorange and delta range measurements becomes said previous predicted pseudorange and delta range measurements during said current epoch in the step (a).

3. A full fusion positioning method, as recited in claim 2, wherein said initialization step is a conventional standard GPS signal acquisition step of providing initial GPS position and velocity data, wherein an initial GPS position and velocity data is used to compute said initial predicted pseudorange and delta range measurements.

4. A full fusion positioning method, as recited in claim 1, further comprising the following steps, after the step (c), for another current epoch after said current epoch through the steps (a) to (c), wherein said current epoch in the steps (a) to (c) becomes a previous current epoch in the following steps:
    (d) receiving Global Positioning System (GPS) signals, which are Radio Frequency (RF) signals, within said another current epoch for said carrier by said GPS antenna and said predicted pseudorange and delta range measurements for said previous current epoch from said data fusion device, and converting and tracking said GPS signals by using said GPS signals and said current predicted pseudorange and delta range measurements obtained in the step (c) to obtain current pseudorange and delta range measurements and current tacking errors of said pseudorange and delta range measurements, which are passed to said data fusion device;
    (e) producing an angular rate and an acceleration data for said carrier by said Inertial Measurement Unit (IMU) within said another current epoch, receiving current optimal estimate of navigation solution errors and IMU errors for said another current epoch from said data fusion device, and solving current inertial navigation equations using said angular rate and said acceleration data to obtain current referencing navigation solution of said carrier, including position, velocity, and attitude of said carrier, for said another current epoch which are passed to said data fusion device;
    (f) fusing said pseudorange measurement and said delta range measurement, said tracking errors of said pseudorange and delta range measurements, and said current referencing navigation solution for said another current epoch, so as to:
        produce another current predicted pseudorange and delta range measurements for said current epoch;
        produce current optimal estimate of said current referencing navigation solution errors and IMU errors for said another current error and current optimal estimate of clock offset and offset rate of said GPS receiver for said another current epoch;
        remove said current errors of said current referencing navigation solution using said current optimal estimate of said current referencing navigation solution errors and IMU errors to provide another corrected navigation solution; and
        output said another corrected navigation solution of said carrier;

(g) repeating the steps (d) to (f) for each next current epoch.

5. A full fusion positioning method, as recited in claim 2, further comprising the following steps, after the step (c), for another current epoch after said current epoch through the steps (a) to (c), wherein said current epoch in the steps (a) to (c) becomes a previous current epoch in the following steps:

(d) receiving Global Positioning System (GPS) signals, which are Radio Frequency (RF) signals, within said another current epoch for said carrier by said GPS antenna and said predicted pseudorange and delta range measurements for said previous current epoch from said data fusion device, and converting and tracking said GPS signals by using said GPS signals and said current predicted pseudorange and delta range measurements obtained in the step (c) to obtain current pseudorange and delta range measurements and current tacking errors of said pseudorange and delta range measurements, which are passed to said data fusion device;

(e) producing an angular rate and an acceleration data for said carrier by said Inertial Measurement Unit (IMU) within said another current epoch, receiving current optimal estimate of navigation solution errors and IMU errors for said another current epoch from said data fusion device, and solving current inertial navigation equations using said angular rate and said acceleration data to obtain current referencing navigation solution of said carrier, including position, velocity, and attitude of said carrier, for said another current epoch which are passed to said data fusion device;

(f) fusing said pseudorange measurement and said delta range measurement, said tracking errors of said pseudorange and delta range measurements, and said current referencing navigation solution for said another current epoch, so as to:

produce another current predicted pseudorange and delta range measurements for said current epoch;

produce current optimal estimate of said current referencing navigation solution errors and IMU errors for said another current error and current optimal estimate of clock offset and offset rate of said GPS receiver for said another current epoch;

remove said current errors of said current referencing navigation solution using said current optimal estimate of said current referencing navigation solution errors and IMU errors to provide another corrected navigation solution; and output said another corrected navigation solution of said carrier;

(g) repeating the steps (d) to (f) for each next current epoch.

6. A full fusion positioning method, as recited in claim 3, further comprising the following steps, after the step (c), for anther current epoch after said current epoch through the steps (a) to (c), wherein said current epoch in the steps (a) to (c) becomes a previous current epoch in the following steps:

(d) receiving Global Positioning System (GPS) signals, which are Radio Frequency (RF) signals, within said another current epoch for said carrier by said GPS antenna and said predicted pseudorange and delta range measurements for said previous current epoch from said data fusion device, and converting and tracking said GPS signals by using said GPS signals and said current predicted pseudorange and delta range measurements obtained in the step (c) to obtain current pseudorange and delta range measurements and current tacking errors of said pseudorange and delta range measurements, which are passed to said data fusion device;

(e) producing an angular rate and an acceleration data for said carrier by said Inertial Measurement Unit (IMU) within said another current epoch, receiving current optimal estimate of navigation solution errors and IMU errors for said another current epoch from said data fusion device, and solving current inertial navigation equations using said angular rate and said acceleration data to obtain current referencing navigation solution of said carrier, including position, velocity, and attitude of said carrier, for said another current epoch which are passed to said data fusion device;

(f) fusing said pseudorange measurement and said delta range measurement, said tracking errors of said pseudorange and delta range measurements, and said current referencing navigation solution for said another current epoch, so as to:

produce another current predicted pseudorange and delta range measurements for said current epoch;

produce current optimal estimate of said current referencing navigation solution errors and IMU errors for said another current error and current optimal estimate of clock offset and offset rate of said GPS receiver for said another current epoch;

remove said current errors of said current referencing navigation solution using said current optimal estimate of said current referencing navigation solution errors and IMU errors to provide another corrected navigation solution; and output said another corrected navigation solution of said carrier;

(g) repeating the steps (d) to (f) for each next current epoch.

7. A full fusion positioning method, as recited in claim 1, 4, 5 or 6, wherein the step (a) further comprises the steps of:

(a-1) inputting said GPS signals received by said GPS antenna, which are radio frequency (RF) signals, to a RF/IF converter; mixing said input GPS signals with first local signals from a local numerically controlled oscillator to form a first mixed GPS signals; band-pass filtering said first mixed GPS signals into Intermediate Frequency (IF) GPS signals; and sending said IF GPS signals to a IF/baseband converter;

(a-2) mixing said IF GPS signals from said RF/IF converter, which are received by said IF/baseband converter with second local signals from said local numerically controlled oscillator to form a second mixed GPS signals, wherein said second mixed GPS signals are amplified, low-pass filtered, and transformed onto baseband GPS signals which are sent to a A/D converter;

(a-3) receiving said baseband GPS signals from said IF/baseband converter, which are analog signals, by said A/D converter; sampling said analog baseband GPS signals to form digital baseband GPS signals, and outputting said digital baseband GPS signals to a digital signal processing device;

(a-4) receiving said digital baseband GPS signals from said AD converter and said predicted pseudorange and delta range measurements from said data fusion device by said digital signal processing; transforming said predicted pseudorange and delta range measurements to code delay and carrier Doppler shift data, respectively; and deducing a pseudorange and delta range measurements, and tracking errors of said pseudorange and delta range for each tracked satellite, which are input to said data fusion device.

8. A full fusion positioning method, as recited in claim 7, wherein the step (a-4) further comprises the steps of:

receiving said digital baseband GPS signals from said (A/D) converter by a mixer, mixing said digital baseband GPS signals with local in-phase (I) and quadraphase (Q) signals from a sine-cosine generator, to form mixed local in-phase (I) and quadraphase (Q) data to a correlation module;

receiving said mixed local in-phase (I) and quadraphase (Q) data from said mixer and local codes generated from a code generator by said correlation module, which are used to perform a correlation computation, wherein results of said correlation computation are output to a maximum-Likelihood Estimator;

collecting N samples of said results of said correlation computation by said Maximum Likelihood Estimation, wherein maximum likelihood estimates of tracking errors of said code delay and carrier phase Doppler shift data are made by said Maximum Likelihood Estimation, and are transformed to said tracking errors of said pseudorange and delta range respectively, which are sent to said data fusion device;

accepting a predicted carrier Doppler shift by a code oscillator to compute a code rate, wherein a generated code with said code rate is formed by said code oscillator to a code generator;

accepting said generated code with said code rate from said code oscillator and a predicted code delay by said code generator, so as to generate a local prompt code, which is sent to said correlation module to compute pseudorange measurements, wherein said pseudorange measurements are output to said data fusion device and to perform demodulation of satellite ephemeris to obtain satellite ephemeris, which are output to said data fusion device; and receiving said predicted carrier Doppler shift by a sine-cosine generator to generate said local in-phase (I) and quadraphase (Q) signals, which are sent to said mixer, and to compute said delta range measurements, which are sent to said data fusion device.

9. A full fusion positioning method, as recited in claim 1, 4, 5, or 6, wherein the step (b) further comprises the steps of:

(b-1) inputting said angular rate and acceleration data from said inertial measurement unit with three orthogonally mounted gyros and three orthogonally mounted accelerometers and said optimal estimate of IMU errors from said data fusion device to an error compensation module;

(b-2) compensating errors of said three axis angular rates and accelerations with said optimal estimate of IMU errors to form compensated three axis angular rates and compensated three axis accelerations, wherein said compensated three axis angular rates are output to an attitude matrix computation module and said three axis angular accelerations are output to a coordinate transformation module;

(b-3) receiving, by said attitude matrix computation module, said compensated three axis angular rates from said error compensation module, a rotation rate vector of a local navigation frame (n frame) relative to an inertial frame (i frame) from an earth and vehicle rate computation module, and said optimal estimate of referencing navigation solution errors from said data fusion device, which are used to perform an update of an attitude matrix from a body frame (b frame) to said navigation frame (n frame) and to remove error of said attitude matrix, wherein said updated attitude matrix is output to said coordinate transformation module and a referencing navigation computation module, (b-4) accepting, by said coordinate transformation module, said compensated accelerations from said error compensation module, which are expressed in the body frame, and said attitude matrix from said attitude matrix computation module, which used to transform said accelerations expressed in said body frame to accelerations expressed in said navigation frame, wherein said accelerations expressed in said navigation frame are output to said referencing navigation computation module;

(b-5) receiving, by said referencing navigation computation module, said accelerations expressed in said navigation frame from said coordinate transformation, and said attitude matrix obtained from said attitude matrix computation, and said optimal estimate of the referencing navigation errors from said data fusion device, which are used to compute said referencing position, velocity, and attitude, and to remove errors of said position and velocity solution, wherein said referencing navigation solution, including said position, velocity, and attitude are output to said earth and vehicle rate computation module and said data fusion device; and (b-6) receiving, by said Earth and vehicle rate computation module, said referencing navigation solution from said referencing navigation module, which is used to compute said rotation rate vector of said local navigation frame (n frame) relative to said inertial frame (i frame), which is output to said attitude matrix computation module.

10. A full fusion positioning method, as recited in claim 7, wherein the step (b) further comprises the steps of:

(b-1) inputting said angular rate and acceleration data from said inertial measurement unit with three orthogonally mounted gyros and three orthogonally mounted accelerometers and said optimal estimate of IMU errors from said data fusion device to an error compensation module;

(b-2) compensating errors of said three axis angular rates and accelerations with said optimal estimate of IMU errors to form compensated three axis angular rates and compensated three axis accelerations, wherein said compensated three axis angular rates are output to an attitude matrix computation module and said three axis angular accelerations are output to a coordinate transformation module;

(b-3) receiving, by said attitude matrix computation module, said compensated three axis angular rates from said error compensation module, a rotation rate vector of a local navigation frame (n frame) relative to an inertial frame (i frame) from an earth and vehicle rate computation module, and said optimal estimate of referencing navigation solution errors from said data fusion device, which are used to perform an update of an attitude matrix from a body frame (b frame) to said navigation frame (n frame) and to remove error of said attitude matrix, wherein said updated attitude matrix is output to said coordinate transformation module and a referencing navigation computation module, (b-4) accepting, by said coordinate transformation module, said compensated accelerations from said error, compensation module, which are expressed in the body frame, and said attitude matrix from said attitude matrix computation module, which used to transform said accelerations expressed in said body frame to accelerations expressed in said navigation frame, wherein said accelerations expressed in said navigation frame are output to said referencing navigation computation module;

(b-5) receiving, by said referencing navigation computation module, said accelerations expressed in said navigation frame from said coordinate transformation, and said attitude matrix obtained from said attitude matrix computation, and said optimal estimate of the referencing navigation errors from said data fusion device, which are used to compute said referencing position, velocity, and attitude, and to remove errors of said position and velocity solution, wherein said referencing navigation solution, including said position, velocity, and attitude are output to said earth and vehicle rate computation module and said data fusion device; and (b-6) receiving, by said Earth and vehicle rate computation module, said referencing navigation solution from said referencing navigation module, which is used to compute said rotation rate vector of said local navigation frame (n frame) relative to said inertial frame (i frame), which is output to said attitude matrix computation module.

11. A full fusion positioning method, as recited in claim 8, wherein the step (b) further comprises the steps of:

(b-1) inputting said angular rate and acceleration data from said inertial measurement unit with three orthogonally mounted gyros and three orthogonally mounted accelerometers and said optimal estimate of IMU errors from said data fusion device to an error compensation module;

(b-2) compensating errors of said three axis angular rates and accelerations with said optimal estimate of IMU errors to form compensated three axis angular rates and compensated three axis accelerations, wherein said compensated three axis angular rates are output to an attitude matrix computation module and said three axis angular accelerations are output to a coordinate transformation module;

(b-3) receiving, by said attitude matrix computation module, said compensated three axis angular rates from said error compensation module, a rotation rate vector of a local navigation frame (n frame) relative to an inertial frame (i frame) from an earth and vehicle rate computation module, and said optimal estimate of referencing navigation solution errors from said data fusion device, which are used to perform an update of an attitude matrix from a body frame (b frame) to said navigation frame (n frame) and to remove error of said attitude matrix, wherein said updated attitude matrix is output to said coordinate transformation module and a referencing navigation computation module, (b-4) accepting, by said coordinate transformation module, said compensated accelerations from said error compensation module, which are expressed in the body frame, and said attitude matrix from said attitude matrix computation module, which used to transform said accelerations expressed in said body frame to accelerations expressed in said navigation frame, wherein said accelerations expressed in said navigation frame are output to said referencing navigation computation module;

(b-5) receiving, by said referencing navigation computation module, said accelerations expressed in said navigation frame from said coordinate transformation, and said attitude matrix obtained from said attitude matrix computation, and said optimal estimate of the referencing navigation errors from said data fusion device, which are used to compute said referencing position, velocity, and attitude, and to remove errors of said position and velocity solution, wherein said referencing navigation solution, including said position, velocity, and attitude are output to said earth and vehicle rate computation module and said data fusion device; and (b-6) receiving, by said Earth and vehicle rate computation module, said referencing navigation solution from said referencing navigation module, which is used to compute said rotation rate vector of said local navigation frame (n frame) relative to said inertial frame (i frame), which is output to said attitude matrix computation module.

12. A full fusion positioning method, as recited in claim 9, wherein the step (b-1) further comprises the steps of:

(b-1-1) receiving redundant angular rates and accelerations from said inertial measurement unit which comprises more than three skewed mounted gyros and more than three skewed mounted accelerometers;

(b-1-2) performing failure detection and isolation to detect and isolate potential gyro and accelerometer failures;

(b-1-3) solving said angular rate and acceleration data from said redundant angular rates and accelerations; and (b-1-4) inputting said angular rate and acceleration data to an error compensation module.

13. A full fusion positioning method, as recited in claim 10, wherein the step (b-1) further comprises the steps of:

(b-1-1) receiving redundant angular rates and accelerations from said inertial measurement unit which comprises more than three skewed mounted gyros and more than three skewed mounted accelerometers;

(b-1-2) performing failure detection and isolation to detect and isolate potential gyro and accelerometer failures;

(b-1-3) solving said angular rate and acceleration data from said redundant angular rates and accelerations; and (b-1-4) inputting said angular rate and acceleration data to an error compensation module.

14. A full fusion positioning method, as recited in claim 13, wherein the step (b-1) further comprises the steps of:

(b-1-1) receiving redundant angular rates and accelerations from said inertial measurement unit which comprises more than three skewed mounted gyros and more than three skewed mounted accelerometers;

(b-1-2) performing failure detection and isolation to detect and isolate potential gyro and accelerometer failures;

(b-1-3) solving said angular rate and acceleration data from said redundant angular rates and accelerations; and (b-1-4) inputting said angular rate and acceleration data to an error compensation module.

15. A full fusion positioning method, as recited in claim 9, wherein the step (c) further comprises the steps of:

(c-1) passing said referencing navigation solution to a predicted pseudorange and delta range measurements computation module, so as to output as a full fusion positioning solution;

(c-2) accepting, by said predicted pseudorange and delta range measurements computation module, a satellite ephemeris from each digital signal processing of each tracked GPS satellite channel, said referencing navigation solution and said optimal estimate of said clock offset and offset rate of said GPS receiving set from said data fusion device;

(c-3) calculating said predicted pseudorange and delta range measurements for said each tracked GPS satellite channel using a GPS satellite position and velocity of said satellite ephemeris, a position and velocity of said referencing navigation solution, estimated clock offset and offset rate, a deterministic clock correction of said GSP signals, and computed atmospheric delays of said satellite ephemeris;

(c-4) outputting said predicted pseudorange and delta range measurements for said each tracked GPS satellite channel to a centralized filter and to said digital signal processing of said each tracked GPS satellite channel to enclose each signal tracking loop of said GPS signals;

(c-5) modeling, by said centralized filter, dynamics of referencing navigation parameter errors including three position parameter errors, three velocity parameter errors, three attitude parameter errors; IMU errors including accelerometer measurement errors, gyro measurement errors, and said clock offset and offset rate of said GPS receiving set to form a system equation of said centralized filter, and (c-6) processing measured pseudorange and delta range measurements and said tracking errors of said pseudorange and delta range measurements from said each digital signal processing for all said tracked GPS satellite channels, said predicted pseudorange and delta range measurements for all said tracked GPS satellite channels and satellite ephemeris, and said referencing navigation solution from said predicted pseudorange and delta range measurements computation module to form a measurement equation of said centralized filter and to perform the step of:

updating parameters of said system equation and said measurement equation;

computing parameters for a discrete model of said system equation;

computing parameters for a linear model of said measurement equation;

computing a time propagation of a state estimation and covariance matrix;

differencing said measured pseudorange and delta range measurements with said predicted pseudorange and delta range measurements to achieved differences which are compensated with said tracking errors of said pseudorange and delta range measurements and used as measurements of said centralized filter, computing measurement residuals; and updating said state estimation and covariance matrix and obtaining said optimal estimate of said referencing navigation solution errors, said IMU errors, and said clock offset and offset rate of said GPS receiving set.

16. A full fusion positioning method, as recited in claim 10, wherein the step (c) further comprises the steps of:

(c-1) passing said referencing navigation solution to a predicted pseudorange and delta range measurements computation module, so as to output as a full fusion positioning solution;

(c-2) accepting, by said predicted pseudorange and delta range measurements computation module, a satellite ephemeris from each digital signal processing of each tracked GPS satellite channel, said referencing navigation solution and said optimal estimate of said clock offset and offset rate of said GPS receiving set from said data fusion device;

(c-3) calculating said predicted pseudorange and delta range measurements for said each tracked GPS satellite channel using a GPS satellite position and velocity of said satellite ephemeris, a position and velocity of said referencing navigation solution, estimated clock offset and offset rate, a deterministic clock correction of said GSP signals, and computed atmospheric delays of said satellite ephemeris;

(c-4) outputting said predicted pseudorange and delta range measurements for said each tracked GPS satellite channel to a centralized filter and to said digital signal processing of said each tracked GPS satellite channel to enclose each signal tracking loop of said GPS signals;

(c-5) modeling, by said centralized filter, dynamics of referencing navigation parameter errors including three position parameter errors, three velocity parameter errors, three attitude parameter errors; IMU errors including accelerometer measurement errors, gyro measurement errors, and said clock offset and offset rate of said GPS receiving set to form a system equation of said centralized filter; and (c-6) processing measured pseudorange and delta range measurements and said tracking errors of said pseudorange and delta range measurements from said each digital signal processing for all said tracked GPS satellite channels, said predicted pseudorange and delta range measurements for all said tracked GPS satellite channels and satellite ephemeris, and said referencing navigation solution from said predicted pseudorange and delta range measurements computation module to form a measurement equation of said centralized filter and to perform the step of:

updating parameters of said system equation and said measurement equation;

computing parameters for a discrete model of said system equation;

computing parameters for a linear model of said measurement equation;

computing a time propagation of a state estimation and covariance matrix;

differencing said measured pseudorange and delta range measurements with said predicted pseudorange and delta range measurements to achieved differences which are compensated with said tracking errors of said pseudorange and delta range measurements and used as measurements of said centralized filter, computing measurement residuals; and updating said state estimation and covariance matrix and obtaining said optimal estimate of said referencing navigation solution errors, said IMU errors, and said clock offset and offset rate of said GPS receiving set.

17. A full fusion positioning method, as recited in claim 11, wherein the step (c) further comprises the steps of:

(c-1) passing said referencing navigation solution to a predicted pseudorange and delta range measurements computation module, so as to output as a full fusion positioning solution;

(c-2) accepting, by said predicted pseudorange and delta range measurements computation module, a satellite ephemeris from each digital signal processing of each tracked GPS satellite channel, said referencing navigation solution and said optimal estimate of said clock offset and offset rate of said GPS receiving set from said data fusion device;

(c-3) calculating said predicted pseudorange and delta range measurements for said each tracked GPS satellite channel using a GPS satellite position and velocity of said satellite ephemeris, a position and velocity of said referencing navigation solution, estimated clock offset and offset rate, a deterministic clock correction of said GSP signals, and computed atmospheric delays of said satellite ephemeris;

(c-4) outputting said predicted pseudorange and delta range measurements for said each tracked GPS satellite channel to a centralized filter and to said digital signal processing of said each tracked GPS satellite channel to enclose each signal tracking loop of said GPS signals;

(c-5) modeling, by said centralized filter, dynamics of referencing navigation parameter errors including three position parameter errors, three velocity parameter errors, three attitude parameter errors; IMU errors including accelerometer measurement errors, gyro measurement errors, and said clock offset and offset rate of said GPS receiving set to form a system equation of said centralized filter; and (c-6) processing measured pseudorange and delta range measurements and said tracking errors of said pseudorange and delta range measurements from said each digital signal processing for all said tracked GPS satellite channels, said predicted pseudorange and delta range measurements for all said tracked GPS satellite channels and satellite ephemeris, and said referencing navigation solution from said predicted pseudorange and delta range measurements computation module to form a measurement equation of said centralized filter and to perform the step of:

updating parameters of said system equation and said measurement equation;

computing parameters for a discrete model of said system equation;

computing parameters for a linear model of said measurement equation;

computing a time propagation of a state estimation and covariance matrix;

differencing said measured pseudorange and delta range measurements with said predicted pseudorange and delta range measurements to achieved differences which are compensated with said tracking errors of said pseudorange and delta range measurements and used as measurements of said centralized filter, computing measurement residuals; and updating said state estimation and covariance matrix and obtaining said optimal estimate of said referencing navigation solution errors, said IMU errors, and said clock offset and offset rate of said GPS receiving set.

18. A full fusion positioning method, as recited in claim 15, wherein after the step (c-6), further comprising an additional step of:

(c-7) inputting said measurement residuals from said centralized filter to a failure detection, isolation, and recovery (FDIR) module, so as to perform a test-statistical distribution of said input measurement residuals to detect and isolate a failure of said pseudorange and delta range measurements from the step (a) caused by a malfunction of said GPS receiver, wherein when said failure is detected, an indication of said malfunction of said GPS receiver is output by said FDIR to said centralized filter to isolate said malfunction or update said centralized filter.

19. A full fusion positioning method, as recited in claim 16, wherein after the step (c-6), further comprising an additional step of:

(c-7) inputting said measurement residuals from said centralized filter to a failure detection, isolation, and recovery (FDIR) module, so as to perform a test-statistical distribution of said input measurement residuals to detect and isolate a failure of said pseudorange and delta range measurements from the step (a) caused by a malfunction of said GPS receiver, wherein when said failure is detected, an indication of said malfunction of said GPS receiver is output by said FDIR to said centralized filter to isolate said malfunction or update said centralized filter.

20. A full fusion positioning method, as recited in claim 17, wherein after the step (c-6), further comprising an additional step of:

(c-7) inputting said measurement residuals from said centralized filter to a failure detection, isolation, and recovery (FDIR) module, so as to perform a test-statistical distribution of said input measurement residuals to detect and isolate a failure of said pseudorange and delta range measurements from the step (a) caused by a malfunction of said GPS receiver, wherein when said failure is detected, an indication of said malfunction of said GPS receiver is output by said FDIR to said centralized filter to isolate said malfunction or update said centralized filter.

21. A full fusion positioning method, as recited in claim 20, wherein the step (b-1) further comprises the steps of:

(b-1-1) receiving redundant angular rates and accelerations from said inertial measurement unit which comprises more than three skewed mounted gyros and more than three skewed mounted accelerometers;

(b-1-2) performing failure detection and isolation to detect and isolate potential gyro and accelerometer failures;

(b-1-3) solving said angular rate and acceleration data from said redundant angular rates and accelerations; and (b-1-4) inputting said angular rate and acceleration data to an error compensation module.

22. A full fusion positioning method, as recited in claim 9, wherein the step (c) further comprises the steps of:

(c-1) passing said referencing navigation solution to a predicted pseudorange and delta range measurements computation module, so as to output as a full fusion positioning solution;

(c-2) accepting, by said predicted pseudorange and delta range measurements computation module, a satellite ephemeris from each digital signal processing of each tracked GPS satellite channel, said referencing navigation solution and said optimal estimate of said clock offset and offset rate of said GPS receiving set from said data fusion device;

(c-3) calculating said predicted pseudorange and delta range measurements for said each tracked GPS satellite channel using a GPS satellite position and velocity of said satellite ephemeris, a position and velocity of said referencing navigation solution, estimated clock offset and offset rate, a deterministic clock correction of said each tracked GPS satellite from said satellite ephemeris, and computed atmospheric delays of said GPS signals;

(c-4) outputting said predicted pseudorange and delta range measurements for said each tracked GPS satellite channel to each local filter for said each tracked GPS satellite channel and to said digital signal processing of said each tracked GPS satellite channel to enclose each signal tracking loop of said GPS signals;

(c-5) modeling, by said each local filter, dynamics of referencing navigation parameter errors including three position parameter errors, three velocity parameter errors, three attitude parameter errors; IMU errors including accelerometer measurement errors, gyro measurement errors, and said clock offset and offset rate of said GPS receiving set to form a system equation of said each local filter;

(c-6) processing said measured pseudorange and delta range measurements and said tracking errors of said pseudorange and delta range measurements from said each digital signal processing for all said tracked GPS satellite channels, said predicted pseudorange and delta range measurements for all said tracked GPS satellite channels and satellite ephemeris, and said referencing navigation solution from said predicted pseudorange and delta range measurements computation module to form a measurement equation of said each local filter and to perform the step of:

updating parameters of said system equation and said measurement equation;

computing parameters for a discrete model of said system equation;

computing parameters for a linear model of said measurement equation;

computing a time propagation of a state estimation and covariance matrix;

differencing said measured pseudorange and delta range measurements with said predicted pseudorange and delta range measurements to achieved differences which are compensated with said tracking errors of said pseudorange and delta range measurements and used as measurements of said each local filter, computing measurement residuals; and updating said state estimation and covariance matrix and obtaining said optimal estimate of said referencing navigation solution errors, said IMU errors, and said clock offset and offset rate of said GPS receiving set; and (c-7) inputting said state estimation and covariance matrix from said each local filter to a master filter for performing fusion processing to obtain global optimal state estimates.

23. A full fusion positioning method, as recited in claim 10, wherein the step (c) further comprises the steps of:

(c-1) passing said referencing navigation solution to a predicted pseudorange and delta range measurements computation module, so as to output as a full fusion positioning solution;

(c-2) accepting, by said predicted pseudorange and delta range measurements computation module, a satellite ephemeris from each digital signal processing of each tracked GPS satellite channel, said referencing navigation solution and said optimal estimate of said clock offset and offset rate of said GPS receiving set from said data fusion device;

(c-3) calculating said predicted pseudorange and delta range measurements for said each tracked GPS satellite channel using a GPS satellite position and velocity of said satellite ephemeris, a position and velocity of said referencing navigation solution, estimated clock offset and offset rate, a deterministic clock correction of said each tracked GPS satellite from said satellite ephemeris, and computed atmospheric delays of said GPS signals;

(c-4) outputting said predicted pseudorange and delta range measurements for said each tracked GPS satellite channel to a each local filter for said each tracked GPS satellite channel and to said digital signal processing of said each tracked GPS satellite channel to enclose each signal tracking loop of said GPS signals;

(c-5) modeling, by said each local filter, dynamics of referencing navigation parameter errors including three position parameter errors, three velocity parameter errors, three attitude parameter errors; IMU errors including accelerometer measurement errors, gyro measurement errors, and said clock offset and offset rate of said GPS receiving set to form a system equation of said each local filter;

(c-6) processing said measured pseudorange and delta range measurements and said tracking errors of said pseudorange and delta range measurements from said each digital signal processing for all said tracked GPS satellite channels, said predicted pseudorange and delta range measurements for all said tracked GPS satellite channels and satellite ephemeris, and said referencing navigation solution from said predicted pseudorange and delta range measurements computation module to form a measurement equation of said each local filter and to perform the step of:

updating parameters of said system equation and said measurement equation;

computing parameters for a discrete model of said system equation;

computing parameters for a linear model of said measurement equation;

computing a time propagation of a state estimation and covariance matrix;

differencing said measured pseudorange and delta range measurements with said predicted pseudorange and delta range measurements to achieved differences which are compensated with said tracking errors of said pseudorange and delta range measurements and used as measurements of said each local filter, computing measurement residuals; and updating said state estimation and covariance matrix and obtaining said optimal estimate of said referencing navigation solution errors, said IMU errors, and said clock offset and offset rate of said GPS receiving set; and (c-7) inputting said state estimation and covariance matrix from said each local filter to a master filter for performing fusion processing to obtain global optimal state estimates.

24. A full fusion positioning method, as recited in claim 11, wherein the step (c) further comprises the steps of:

(c-1) passing said referencing navigation solution to a predicted pseudorange and delta range measurements computation module, so as to output as a full fusion positioning solution;

(c-2) accepting, by said predicted pseudorange and delta range measurements computation module, a satellite ephemeris from each digital signal processing of each tracked GPS satellite channel, said referencing navigation solution and said optimal estimate of said clock offset and offset rate of said GPS receiving set from said data fusion device;

(c-3) calculating said predicted pseudorange and delta range measurements for said each tracked GPS satellite channel using a GPS satellite position and velocity of said satellite ephemeris, a position and velocity of said referencing navigation solution, estimated clock offset and offset rate, a deterministic clock correction of said each tracked GPS satellite from said satellite ephemeris, and computed atmospheric delays of said GPS signals;

(c-4) outputting said predicted pseudorange and delta range measurements for said each tracked GPS satellite channel to a each local filter for said each tracked GPS satellite channel and to said digital signal processing of said each tracked GPS satellite channel to enclose each signal tracking loop of said GPS signals;

(c-5) modeling, by said each local filter, dynamics of referencing navigation parameter errors including three position parameter errors, three velocity parameter errors, three attitude parameter errors; IMU errors including accelerometer measurement errors, gyro measurement errors, and said clock offset and offset rate of said GPS receiving set to form a system equation of said each local filter;

(c-6) processing said measured pseudorange and delta range measurements and said tracking errors of said pseudorange and delta range measurements from said each digital signal processing for all said tracked GPS satellite channels, said predicted pseudorange and delta range measurements for all said tracked GPS satellite channels and satellite ephemeris, and said referencing navigation solution from said predicted pseudorange and delta range measurements computation module to form a measurement equation of said each local filter and to perform the step of;

updating parameters of said system equation and said measurement equation;

computing parameters for a discrete model of said system equation;

computing parameters for a linear model of said measurement equation;

computing a time propagation of a state estimation and covariance matrix;

differencing said measured pseudorange and delta range measurements with said predicted pseudorange and delta range measurements to achieved differences which are compensated with said tracking errors of said pseudorange and delta range measurements and used as measurements of said each local filter, computing measurement residuals; and updating said state estimation and covariance matrix and obtaining said optimal estimate of said referencing navigation solution errors, said IMU errors, and said clock offset and offset rate of said GPS receiving set; and (c-7) inputting said state estimation and covariance matrix from said each local filter to a master filter for performing fusion processing to obtain global optimal state estimates.

25. A full fusion positioning method, as recited in claim 22, wherein after the step (c-7), further comprising an additional step of:

(c-8) inputting said measurement residuals from said centralized filter to a failure detection, isolation, and recovery (FDIR) module, so as to perform a test-statistical distribution of said input measurement residuals to detect and isolate a failure of said pseudorange and delta range measurements from the step (a) caused by a malfunction of said GPS receiver, wherein when said failure is detected, an indication of said malfunction of said GPS receiver is output by said FDIR to said centralized filter to isolate said malfunction or update said centralized filter.

26. A full fusion positioning method, as recited in claim 23, wherein after the step (c-7), further comprising an additional step of:

(c-8) inputting said measurement residuals from said centralized filter to a failure detection, isolation, and recovery (FDIR) module, so as to perform a test-statistical distribution of said input measurement residuals to detect and isolate a failure of said pseudorange and delta range measurements from the step (a) caused by a malfunction of said GPS receiver, wherein when said failure is detected, an indication of said malfunction of said GPS receiver is output by said FDIR to said centralized filter to isolate said malfunction or update said centralized filter.

27. A full fusion positioning method, as recited in claim 24, wherein after the step (c-7), further comprising an additional step of:

(c-8) inputting said measurement residuals from said centralized filter to a failure detection, isolation, and recovery (FDIR) module, so as to perform a test-statistical distribution of said input measurement residuals to detect and isolate a failure of said pseudorange and delta range measurements from the step (a) caused by a malfunction of said GPS receiver, wherein when said failure is detected, an indication of said malfunction of said GPS receiver is output by said FDIR to said centralized filter to isolate said malfunction or update said centralized filter.

28. A full fusion positioning method, as recited in claim 27, wherein the step (b-1) further comprises the steps of:

(b-1-1) receiving redundant angular rates and accelerations from said inertial measurement unit which comprises more than three skewed mounted gyros and more than three skewed mounted accelerometers;

(b-1-2) performing failure detection and isolation to detect and isolate potential gyro and accelerometer failures;

(b-1-3) solving said angular rate and acceleration data from said redundant angular rates and accelerations; and (b-1-4) inputting said angular rate and acceleration data to an error compensation module.

29. A full fusion positioning method, as recited in claim 26, wherein, after the step (c-8), further comprises an additional step of:

feeding said state estimation, which includes said optimal estimate of inertial navigation solution errors, said clock offset and offset rate of said GPS receiver, and said IMU errors, and said covariance matrix obtained from said master filter, back to each said local filter to reset said local filter, so as to perform information-sharing among said master filter and said each local filter.

30. A full fusion positioning method, as recited in claim 26, wherein, after the step (c-8), further comprises an additional step of:

feeding said state estimation, which includes said optimal estimate of inertial navigation solution errors, said clock offset and offset rate of said GPS receiver, and said IMU errors, and said covariance matrix obtained from said master filter, back to each said local filter to reset said local filter, so as to perform information-sharing among said master filter and said each local filter.

31. A full fusion positioning method, as recited in claim 27, wherein, after the step (c-8), further comprises an additional step of:

feeding said state estimation, which includes said optimal estimate of inertial navigation solution errors, said clock offset and offset rate of said GPS receiver, and said IMU errors, and said covariance matrix obtained from said master filter, back to each said local filter to reset said local filter, so as to perform information-sharing among said master filter and said each local filter.

32. A full fusion positioning method, as recited in claim 28, wherein, after the step (c-8), further comprises an additional step of:

feeding said state estimation, which includes said optimal estimate of inertial navigation solution errors said clock offset and offset rate of said GPS receiver, and said IMU errors, and said covariance matrix obtained from said master filter, back to each said local filter to reset said local filter, so as to perform information-sharing among said master filter and said each local filter.

* * * * *